US010075710B2

(12) United States Patent
Zhang et al.

(10) Patent No.: US 10,075,710 B2
(45) Date of Patent: Sep. 11, 2018

(54) VIDEO QUALITY MEASUREMENT

(75) Inventors: Fan Zhang, Hubei Province (CN); Ning Liao, Beijing (CN); Kai Xie, Beijing (CN); Zhibo Chen, Beijing (CN)

(73) Assignee: THOMSON Licensing, Issy-les-Moulineaux (FR)

( * ) Notice: Subject to any disclaimer, the term of this patent is extended or adjusted under 35 U.S.C. 154(b) by 462 days.

(21) Appl. No.: 14/353,351

(22) PCT Filed: Nov. 24, 2011

(86) PCT No.: PCT/CN2011/082870
§ 371 (c)(1),
(2), (4) Date: Apr. 22, 2014

(87) PCT Pub. No.: WO2013/075318
PCT Pub. Date: May 30, 2013

(65) Prior Publication Data
US 2014/0286441 A1 Sep. 25, 2014

(51) Int. Cl.
*H04N 19/89* (2014.01)
*H04N 17/00* (2006.01)
*H04N 19/895* (2014.01)

(52) U.S. Cl.
CPC ..... *H04N 19/00933* (2013.01); *H04N 17/004* (2013.01); *H04N 19/895* (2014.11)

(58) Field of Classification Search
None
See application file for complete search history.

(56) References Cited

U.S. PATENT DOCUMENTS

2005/0024487 A1* 2/2005 Chen ............... H04N 19/172
348/14.13
2007/0064812 A1* 3/2007 Baik ............... H04N 19/895
375/240.27

(Continued)

FOREIGN PATENT DOCUMENTS

CN 101635846 1/2010
CN 10485209 12/2011

(Continued)

OTHER PUBLICATIONS

Fuzheng Yang et al: "No-reference quality assessment for networked video via primary analysis of bit Stream", IEEE Transactions on Circuits and Systems Center, vol. 20, n°11, 1 Novembder 2010, pp. 1544-1554.

(Continued)

*Primary Examiner* — Anand S Rao
*Assistant Examiner* — Samuel D Fereja
(74) *Attorney, Agent, or Firm* — Brian J. Dorini; Xiaoan Lu

(57) ABSTRACT

A particular implementation receives a bitstream and derives parameters from the bitstream. The parameters include quantization parameters, content unpredictability parameters, ratios of lost blocks, ratios of propagated blocks, error concealment distances, motion vectors, durations of freezing, and frame rates. Using these parameters, a compression distortion factor, a slicing distortion factor, and a freezing distortion factor are estimated respectively for distortions resulting from video compression, a slicing mode error concealment, and a freezing slicing mode error concealment. The distortion factors are then mapped to a composite video quality score. For applications with limited computational power, the estimation of distortion factors can be simplified. In particular, the compression distortion factor, the slicing distortion factor, and the freezing distortion factor can be (Continued)

predicted from quantization parameters, ratios of lost blocks, and durations of freezing, respectively.

17 Claims, 9 Drawing Sheets

(56) References Cited

U.S. PATENT DOCUMENTS

| | | | | |
|---|---|---|---|---|
| 2007/0242080 | A1* | 10/2007 | Hamada | G09G 5/006 345/606 |
| 2008/0084934 | A1* | 4/2008 | Agrawal | H04N 7/64 375/240.27 |
| 2008/0159410 | A1 | 7/2008 | Perinkulam et al. | |
| 2008/0232478 | A1* | 9/2008 | Teng | H04N 19/00939 375/240.27 |
| 2009/0103617 | A1* | 4/2009 | Au | H04N 19/176 375/240.13 |
| 2009/0148058 | A1* | 6/2009 | Dane | H04N 5/145 382/251 |
| 2009/0244289 | A1* | 10/2009 | Raake | H04L 41/5038 348/180 |
| 2009/0245385 | A1* | 10/2009 | Misuda | H04N 19/176 375/240.24 |
| 2009/0262198 | A1* | 10/2009 | Yamagishi | H04N 17/004 348/180 |
| 2009/0323803 | A1* | 12/2009 | Gomila | H04N 19/172 375/240.02 |
| 2010/0008425 | A1* | 1/2010 | Yamada | H04N 17/004 375/240.16 |
| 2010/0110199 | A1 | 5/2010 | Winkler et al. | |
| 2010/0128791 | A1* | 5/2010 | Le Floch | H04N 19/139 375/240.16 |
| 2010/0278275 | A1* | 11/2010 | Yang | H04N 19/00175 375/240.27 |
| 2011/0085605 | A1* | 4/2011 | Xie | H04N 17/004 375/240.27 |
| 2011/0102601 | A1* | 5/2011 | Davis | H04N 17/004 348/180 |
| 2012/0020415 | A1* | 1/2012 | Yang | H04N 17/004 375/240.27 |
| 2012/0030367 | A1* | 2/2012 | Lei | H04N 21/2402 709/231 |
| 2012/0287999 | A1* | 11/2012 | Li | H04N 19/52 375/240.16 |
| 2012/0327997 | A1* | 12/2012 | Nilsson | H04N 19/176 375/240.02 |

FOREIGN PATENT DOCUMENTS

| | | |
|---|---|---|
| EP | EP1056297 | 11/2000 |
| EP | 2106153 | 9/2009 |
| WO | WO2008093714 | 8/2008 |
| WO | WO 2010009637 A1 * | 1/2010 ........... H04N 17/004 |

OTHER PUBLICATIONS

Hantao Liu et al: "A no-reference perceptual blockiness metric", Acoustics, Speech and Signal Processing, ICASSP 2008 IEEE International Conference on, Mar. 31, 2008, pp. 865-868.

Garcia M N et al: "Impairement-factor-based audio-visual quality model for IPTV", Qualitu of Multimedia Experience, QOMEX 2009. International Workshop on, IEEE, Jul. 29, 2009, pp. 1-6.

Gustafsson J; Raake A: "P.Nbams ToR; 379 (Gen/12)", ITU-T Draft; Study Period 2009-2012; International Telecommunication Union, vol. 14/12, Sep. 17, 2010, pp. 1-19.

Pastrana-Vidal et al: "Métrique perceptuelle de rupture de fluidité vidéo sans référence", Conference Coresa, May 26, 2004.

Shmueli, R., et al., "Effects of an Encoding Scheme on Perceived Video Quality Transmittal Over Lossy Internet Protocol Networks", IEEE Transactions on Broadcasting, IEEE Service Center, Piscataway, NJ, vol. 54, No. 3, September 1, 2008, pp. 628-640.

\* cited by examiner

VIDEO QUALITY MEASUREMENT

This application claims the benefit, under 35 U.S.C. § 365 of International Application PCT/CN2011/082870, filed 24 Nov. 2011, which was published in accordance with PCT Article 21(2) on 30 May 2013, in English.

TECHNICAL FIELD

This invention relates to video quality measurement, and more particularly, to a method and apparatus for determining a quality measure of network transmitted video.

BACKGROUND

In IPTV (Internet protocol television) or other video transmission applications, video signals are processed at different stages. A video signal is usually compressed into a bitstream, which may also be referred to as an elementary stream (ES). The bitstream or ES may be then packetized into a transport stream (TS) and transmitted through an IP channel. The bitstream received at a decoder can be decoded. Error concealment may be performed to the decoded video if necessary. Video quality at the decoder is generally lower than that of the original video due to compression loss and transmission errors. To examine objectively how much the video quality is degraded, the video quality can be measured using transport stream, elementary stream or decoded video.

SUMMARY

According to a general aspect, it determines at least one of a slicing distortion factor and a freezing distortion factor for a bitstream without reconstructing a video corresponding to the bitstream, wherein the slicing distortion factor represents distortion resulting from a slicing mode error concealment and the freezing distortion factor represents distortion resulting from a freezing mode error concealment. It further determines a quality metric in response to the at least one of the slicing distortion factor and the freezing distortion factor.

According to another general aspect, it determines parameters from the bitstream, the parameters including at least one of ratios of lost blocks and durations of freezing. It determines at least one of a slicing distortion factor and a freezing distortion factor for a bitstream without reconstructing a video corresponding to the bitstream, wherein the slicing distortion factor represents distortion resulting from a slicing mode error concealment and the freezing distortion factor represents distortion resulting from a freezing mode error concealment, and wherein the slicing distortion factor is calculated using the ratios of lost blocks and the freezing distortion factor is calculated using the durations of freezing. It further determines a quality metric in response to the at least one of the slicing distortion factor and the freezing distortion factor.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
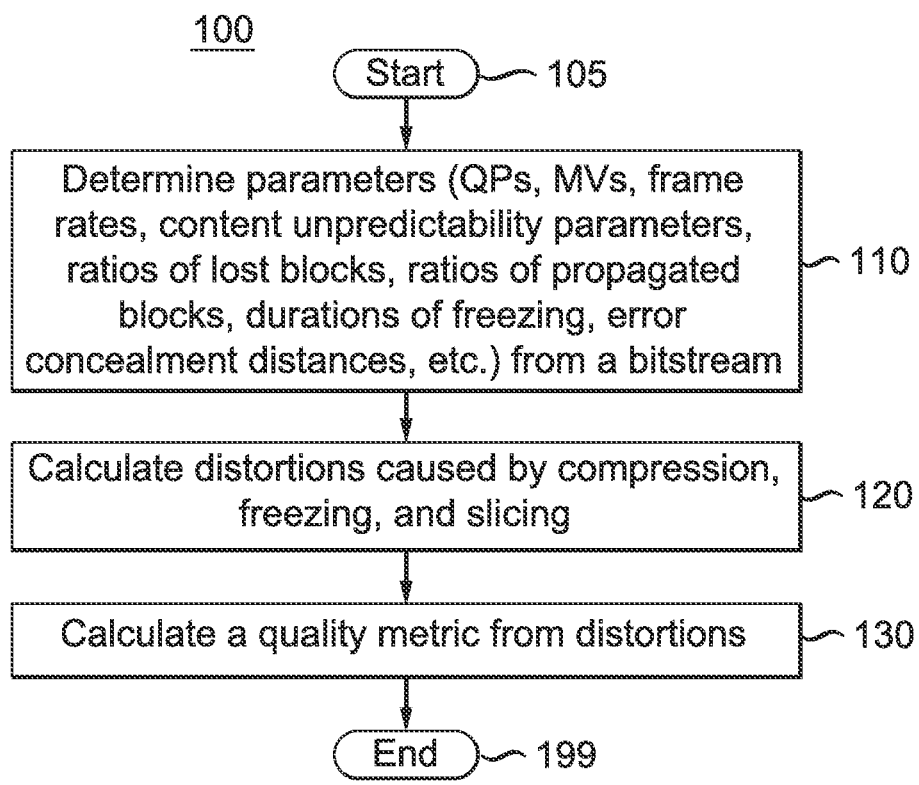
FIG. 1 is a flow diagram depicting an example for calculating a video quality metric, in accordance with an embodiment of the present principles.

Recent standardization work by ITU-T SG12, among other things, paves the way for practical and pragmatic study on the elementary stream based quality measurement.

The present embodiments relate to a no-reference (NR) quality metric that assesses the quality of a distorted video without any reference to the original video. In particular, the present embodiments provide a quality metric based on the quality degradation caused by video compression and transmission losses. In one embodiment, the present principles are to accurately and efficiently predict video quality based on parameters derived from the elementary stream and optional decoded video, based on various scenarios and subjective video quality databases, for example, provided by ITU-T SG 12.

Video encoders often employ quantization techniques to compress video data by reducing the precision of signal values. The quantization parameter (QP) directly controls the bitrate and quality of compressed video. Content complexity also has a significant impact on the perceived quality of compressed video. In particular, visual artifacts in complex videos are more likely to be tolerated by human eye.

Packet losses during video transmission also cause artifacts in different ways, further degrading the quality of compressed video. On one hand, a lost block cannot be reconstructed properly, and thus causes visual artifacts. On the other hand, a received inter predicted block which refers to a corrupted block cannot be reconstructed properly either, and thus causes visual artifact (usually known as error propagation). Blocks with artifacts from transmission losses are denoted as impaired blocks.

To reduce the perceived artifacts, a decoder may try to recover the impaired blocks by error concealment techniques. Different error concealment techniques result in different visual patterns and thus influence the perceived video quality in different manners. In the present principles, two error concealment techniques, namely a slicing mode error concealment and a freezing mode error concealment are considered for quality measurement. The corresponding artifacts are referred to as slicing and freezing respectively.

In a slicing mode error concealment technique, a decoder attempts to repair the lost slice using the pixels that are already reconstructed. Visible artifacts often remain in the picture after such a repair. Usually when the loss rate gets higher, more pixels are impaired and need to be repaired, resulting in stronger slicing artifacts. Thus, the information loss rate is a key factor in calculating the distortion or quality degradation from slicing. The information loss rate may be measured using a packet loss rate or a frame loss rate. Since the packet loss causes lost blocks and impacts blocks through error propagation, the ratio of impaired blocks may also be considered when measuring the information loss rate. The content complexity also affects the perceived video quality. That is, lost information corresponding to dynamic or textured scenes are more difficult to repair than the ones corresponding to still or smooth scenes.

In a freezing mode error concealment technique, when a reference frame, for example, an I, P, or reference B frame is lost, the decoder freezes decoding and repeats the previous correctly decoded picture until a frame without referring (directly or indirectly) to the lost frame is correctly received. When a non-reference frame, for example, a non-reference B frame is lost, the decoder only freezes decoding for the lost frame since the subsequent frames can be decoded without referring to the non-reference frame. Usually when the packet loss rate gets higher, more pictures are lost, resulting in more frozen pictures.

Most existing video compression standards, for example, H.264 and MPEG-2, use a macroblock (MB) as the basic encoding unit. Thus, the following embodiments use a macroblock as the basic processing unit. However, the principles may be adapted to use a block at a different size, for example, an 8×8 block, a 16×8 block, a 32×32 block, and a 64×64 block.

FIG. 1 illustrates an exemplary method 100 that estimates the video quality using a three-layer hierarchical model. Method 100 starts with start block 105 that passes control to a function block 110. In block 110, parameters that will be used for quality estimation are derived from the bitstream. The bitstream corresponds to a video clip and it may be an elementary stream from a transport stream. In block 120, the parameters are used to calculate the distortion factors caused by compression, slicing, and freezing. In block 130, different distortion factors are combined and converted to a composite quality score. Control is then passed to end block 199. In the following, the steps of parameter determination, distortion calculation, and quality metric calculation are discussed in further detail. Note that pictures need not to be fully decoded (i.e., no decoded pictures are reconstructed) in method 100.

Parameter Determination

Distortion caused by each type of impairment (i.e., compression, slicing, and freezing) is dominated by a corresponding key factor. For example, the quantization parameter is a key factor to compression impairment, a ratio of lost macroblocks is a key factor to slicing impairment, and the duration of freezing is a key factor to freezing impairment. Other parameters also affect the perceived video quality. For example, motion vectors (MVs) reflect whether the content contains dynamic or still objects, and the content complexity describes whether the content is textured or smooth. Both motion and content complexity affect how the received or concealed pictures are perceived by human eyes.

TABLE 1

Exemplary parameters.

| Parameters | Descriptions |
|---|---|
| QP | Quantization parameter |
| CU | Content unpredictability parameter |
| EC | Ratio of lost blocks |
| EP | Ratio of propagated blocks |
| ED | Error concealment distance |
| MV | Motion vectors |
| FD | Duration of freezing |
| FR | Frame rate |

TABLE 1 lists exemplary parameters that may be used to predict the video quality according to present embodiments. A short description of each parameter is also included in TABLE 1. More details about each parameter are provided below.

QP (Quantization Parameter)

A quantization parameter is used when quantizing transform coefficients in a video encoder. For H.264, each macroblock is associated with a QP, which corresponds to a quantization step size. Similarly, a QP is defined for each macroblock in other standards, such as H.263 and MPEG-2. A larger QP, i.e., a coarser quantization, usually results in a lower quality of the compressed video.

CU (Content Unpredictability Parameter)

A content unpredictability parameter, denoted as CU, is defined as the variance of residual, and theoretically can be approximated by DCT coefficients. It indicates the degree of spatio-temporal variations in a set of pictures. Generally, the greater the variations are, the more difficult it is to efficiently encode the pictures or to conceal the pictures. On the other hand, more distortions can be tolerated by human eyes at complex contents because of the texture masking property of human visual system.

EC (Ratio of Lost Blocks)

The ratio of lost blocks, denoted as EC, is defined as the ratio of the number of lost MBs in the current frame to the total number of MBs in the video clip. Some lost MB may be sufficiently recovered by error concealment and thus hardly affect the perceived video quality. To check whether a lost block is recovered at a sufficiently high quality (i.e., as if the block is correctly received), the pictures may be decoded from the bitstream, as will be discussed later, in an optional step. If a lost block is recovered properly, the ratio of lost blocks will be updated as if the block is not lost.

EP (Ratio of Propagated Blocks)

A ratio of propagated blocks, denoted as EP, is defined as the ratio of the number of the propagated MBs in the current frame to the total number of MBs in the video clip, where the propagated MBs refer to macroblocks that directly or indirectly use lost blocks for prediction. As discussed above, the pictures may be decoded at an optional step to examine whether a block is concealed at a sufficiently high quality. If the block is properly concealed, the ratio of lost blocks (EC) is updated as if the block is not lost. Similarly, the ratio of propagated blocks should be also updated as if the block is not lost.

ED (Error Concealment Distance)

To conceal a lost macroblock, a decoder may fill the macroblock in the current to-be-concealed frame with the MB at the same spatial location in a concealing frame (i.e, a frame used to conceal the current frame), and the concealing frame is usually the last frame in the current reference picture list. An error concealment distance, denoted as ED, is defined as a temporal distance, in a display order, between the to-be-concealed frame and the concealing frame. Note the temporal distance between two pictures in the present application refers to the time interval or time difference between two pictures. The error concealment distance parameter depends on which error concealment technique is used. If the error concealment technique is unknown, ED is set to 1.

Figure 2A:
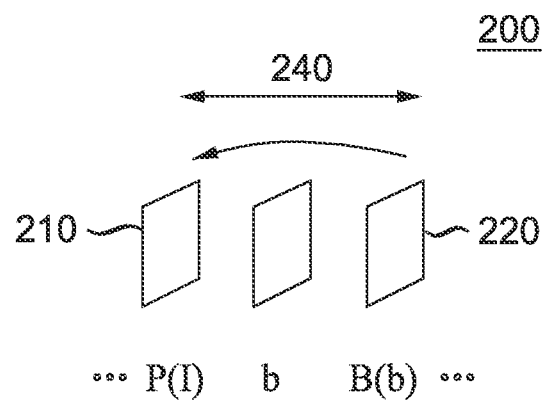
FIGS. 2A and 2B are pictorial examples depicting how to calculate error concealment distances, in accordance with an embodiment of the present principles.
Figure 2B:
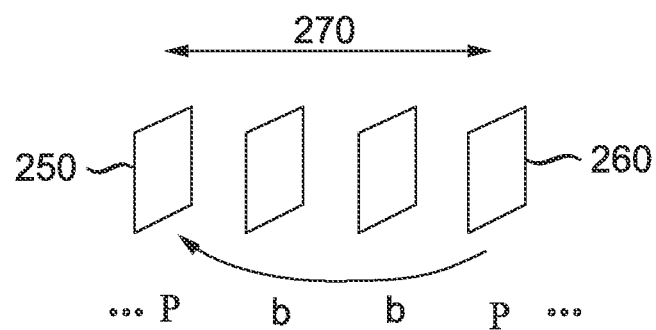

FIGS. 2A and 2B illustrate by examples how to calculate error concealment distances. In FIG. 2A, a reference or a non-reference bi-directional picture 220 is the current picture to be concealed. An I or P picture 210 is the final picture in the reference picture list and is used for concealing picture 220. Thus, the temporal distance 240 between pictures 210 and 220 is the error concealment distance for picture 220. In the example of FIG. 2B, a P picture 260 is the current picture to be concealed and it uses P picture 250 as a concealing picture. Therefore, distance 270 between pictures 250 and 260 is the error concealment distance for picture 260.

In FIG. 2, the pictures are shown in the display order. Note that pictures are usually encoded and decoded in an order different from the display order. The encoding or decoding order should be converted to the display order when calculating the error concealment distance.

MV (Motion Vector)

For an inter frame of H.264 video, each MB is divided into 8×8, 16×8, 8×16 or 16×16 blocks, and each block is associated with a two-dimensional motion vector. An MB-wise motion vector is defined as the average of the corresponding blocks' motion vectors weighted by the ratio of the area of each block to that of the macroblock. A frame-wise MV is defined as the average magnitude of all intact (i.e., not impaired) MBs' motion vectors. For an intra frame, its MV is defined as the MV of a subsequent or preceding inter frame. To count different frame rates, MV may be normalized by the frame rate. That is, MV may be divided by the frame rate. Such a normalized MV can be interpreted as a motion vector of pixel width per second.

FD (Duration of Freezing)

A duration of freezing, denoted by FD, is defined as the temporal duration at when the decoder freezes decoding. When performing error concealment, a decoder may freeze decoding when the picture data or the reference picture is lost, and it may resume decoding upon correctly receiving a frame that does not refer (directly or indirectly) to the lost frame.

FIG. 3 provides several examples depicting how to calculate the durations of freezing. In the example of FIG. 3A, an I or P picture 320 is lost, and thus, the decoder freezes decoding for picture 320 and pictures referring to picture 320. Consequently, bi-directional pictures 310, 315, 322, and 324, and P picture 326 that use picture 320 for prediction are not decoded in addition to picture 320. A properly decoded P picture 305 may be used for concealment for these pictures. That is, pictures 305, 310, 315, 320, 322, 324, and 326 are displayed as picture 305, thus causing a visual pause. The decoder resumes decoding when an intra picture 330 is correctly received. The temporal distance 340, in a display order, between where the decoder freezes decoding (picture 310) and where it resumes decoding (picture 330) is calculated as the duration of freezing.

Figure 3A:
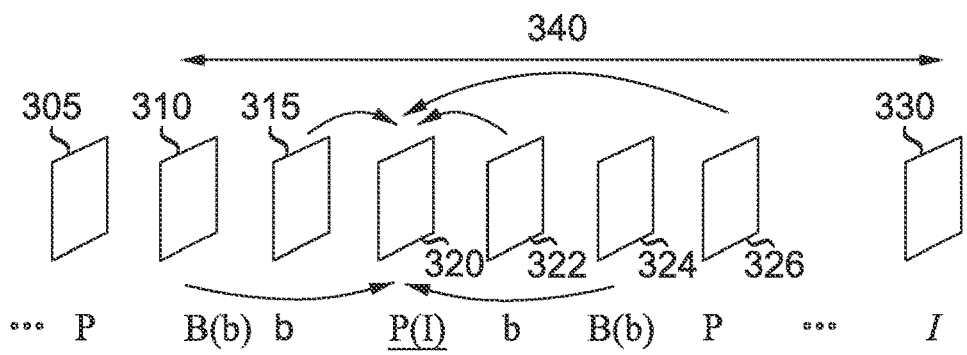
FIG. 3A-3D are pictorial examples of durations of freezing, in accordance with an embodiment of the present principles.
Figure 3B:
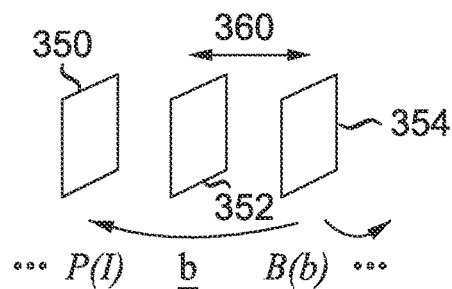

FIG. 3B illustrates an example where a non-reference b picture 352 is lost and not decoded. The decoder freezes decoding at picture 352. Previously decoded picture 350 may be used to conceal picture 352. Since picture 352 is not used as a reference picture for any other pictures, the decoder resumes immediately at the following picture 354. The temporal distance 360 between pictures 352 and 354 is calculated as the duration of freezing for this example.

Figure 3C:
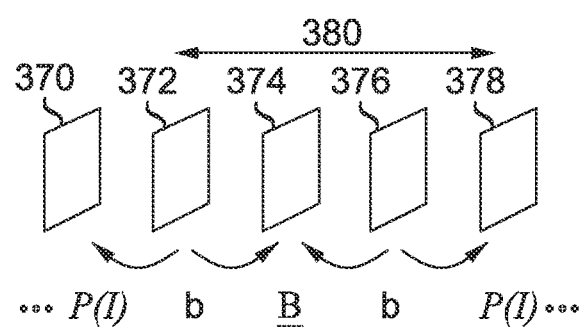

FIG. 3C illustrates an example where a reference B picture 374 is lost. As a reference B picture, picture 372 is only used as a reference by non-reference b pictures 372 and 376. The decoder freezes decoding at picture 372 and resumes decoding at picture 378. The distance 380 between pictures 372 and 378 is calculated as the duration of freezing for this example.

Figure 3D:

Multiple visual pauses, caused by freezing, may occur in a decoded video clip, as shown in an example in FIG. 3D, wherein a video clip is represented by line 395. In this example, a visual pause 390 occurs at the beginning of the video clip, and another visual pause 392 occurs in the middle of the clip.

FR (Frame Rate)

In a limited bandwidth environment, the content provider, encoder, or network provider may reduce the frame rate of videos, for example, for a mobile TV application. When the frame rate is low, for example, 12.5 fps or 15 fps, visual discontinuity may be perceived. This visual discontinuity can be regarded as freezing even though there is no packet loss or error concealment. Thus, the frame rate is taken into account when calculating the duration of freezing.

Distortion Calculation

In the present principles, a compression distortion factor is defined to represent the distortion resulting from compression, which is denoted as $d_c$. In one example, it may be calculated as:

$$d_c = (\log CU_T)^{b1} \times (51 - QP_T)^{b2}, \qquad (1)$$

where $QP_T$ is an average QP for the video clip, $CU_T$ is an average content unpredictability parameter for the video clip, and $b_1$ and $b_2$ are constants. The distortion due to compression is roughly uniform over the video clip, so it can be accurately predicted by a posynomial function with respect to clip-wise parameters.

The calculation in equation (1) is mainly designed for H.264 whose maximum QP value is 51. When the video clip is compressed by other standards, equation (1) should be tuned accordingly, for example, using the appropriate QP parameter.

As discussed before, the information loss rate is a key factor to the strength of perceived slicing artifacts. In one embodiment, a variable $LR_T$ is defined to represent the information loss rate for the video clip. For each frame at time t, the ratio of lost blocks $EC_t$, the ratio of propagated blocks $EP_t$, the content unpredictability parameter $CU_t$, and the error concealment distance $ED_t$ may be used to calculate the variable $LR_T$ as follows:

$$LR_T = \Sigma_t ((\log CU_t)^{c1} \times ED_t^{c2} \times EC_t + c_3 \times (\log CU_t)^{c1} \times EP_t), \qquad (2)$$

where $c_1$, $c_2$, and $c_3$ are constants.

The slicing distortion factor, denoted as $d_s$, then may be estimated as a posynomial function of the information loss rate and the content unpredictability parameter:

$$d_s = e^{b3 FR} \times (\log CU_T)^{b4} \times LR_T^{b5}, \qquad (3)$$

where $CU_T$ is the average content unpredictability parameter for the video clip, and $b_3$, $b_4$, and $b_5$ are constants.

The duration of freezing dominates the quality of a video with frozen pictures. Since the duration of freezing not only depends on the occurrence of packet losses but also relies upon the GOP structure, to accurately predict the duration of freezing, the coding type of a picture (for example, an I frame, a P frame, or a B frame) should be identified. Moreover, the freezing artifact is also affected by the motion in the content, for example, freezing a dynamic scene may appear more annoying than freezing a still scene.

Since the strength of perceived freezing relates to the length of the visual pause and the motion activity of the pictures before the freezing, we define a variable $FR_T$ for each visual pause as a posynomial function of motion and the length of visual pause:

$$FR_T = \sum_\tau \frac{(\log MV_\tau)^{c_4} \times FD_\tau^{c_5}}{N}, \quad (4)$$

where $MV_\tau$ is the average magnitude of MVs in the frame immediately before the current $\tau^{th}$ pause, $FD_\tau$ is the duration of freezing of the $\tau^{th}$ pause, N is the total number of pictures in the clip, and $c_4$ and $c_5$ are constants.

Then, the freezing distortion factor, denoted as $d_f$, may be predicted as a posynomial function as following:

$$d_f = e^{b_6 FR} \times (\log MV_T)^{b_7} \times FD_T^{b_8}, \quad (5)$$

where $MV_T$ is the average magnitude of MVs for the video clip, and $b_6$, $b_7$ and $b_8$ are constants.

As described above, using parameters listed in TABLE 1, the compression distortion factor, slicing distortion factor, and freezing distortion factor may be estimated using equations (1), (3), and (5). The key factor to slicing artifacts, $LR_T$, may be estimated using equation (2). The calculating method using equations (1)-(5) is denoted as a TYPE I method.

In another embodiment, we may use a subset of parameters listed in TABLE 1 to simplify the calculation. The simplified method is denoted as a TYPE II method.

In a TYPE II method, the compression distortion factor may be predicted as:

$$d_c = (51 - QP_T)^{b_2}. \quad (6)$$

To further reduce computational cost, $QP_T$ may be calculated as the average QP of I frames of the video without considering P and B frames. The slicing distortion factor may be predicted as:

$$d_s = (\Sigma_\tau EC_\tau)^{b_5}, \quad (7)$$

where the information loss rate is approximated by the ratio of lost blocks. The freezing distortion factor may be predicted by $$d_f = (\Sigma_\tau FD_\tau)^{b_8}. \quad (8)$$

Quality Metric Calculation

The three types of distortion factors resulting from compression, slicing, and freezing, i.e., $d_c$, $d_s$ and $d_f$, are then combined to generate a composite video quality metric. In one example, the video quality measure, denoted as q, may be calculated as:

$$q = G^{-1}(a_1 d_c + a_2 d_s + a_3 d_f), \; G^{-1}(d) = \frac{1}{1+d}, \quad (9)$$

where $a_1$, $a_2$ and $a_3$ are constants. Note that in this example the video quality measure q is within the range of (0, 1), where 0 corresponds to the worst quality and 1 corresponds to the best quality. In another embodiment, the video quality metric can be scaled or shifted to other ranges, for example, to (1, 5) as in the MOS (Mean Opinion Score). In another embodiment, $$G^{-1}(d) = \frac{\gamma}{1 + \alpha d^\beta},$$

where constants α, β, and γ are used for flexible scaling. Other monotonic mapping functions may be used to map individual distortions to the quality metric, for example, a generalized logistic, log-log, complementary log-log, $3^{rd}$-order polynomial or linear function may be used.

In the above, exemplary embodiments of calculating a video quality metric are discussed, wherein the metric is calculated using parameters derived from the bitstream without full decoding. When extra computation is allowed for full decoding, more features or parameters may be obtained from the decoded video to further improve the video quality metric. For example, mosaic artifacts may be detected from the decoded video to improve the prediction accuracy for the slicing distortion factor.

Figure 4:
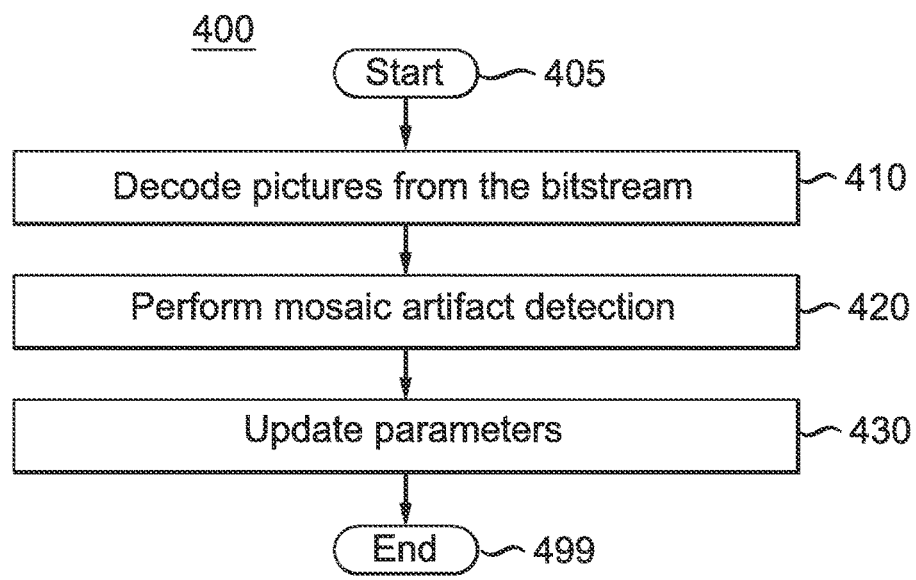
FIG. 4 is a flow diagram depicting an example for updating parameters used in quality measurement, in accordance with an embodiment of the present principles.

For ease of notation, a picture that needs error concealment is called a fragmentary picture. After a fragmentary frame is decoded and concealed by the full decoder, mosaic artifact detection is performed over the fragmentary frame. FIG. 4 illustrates an exemplary method 400 for using artifacts detection to update parameters. Method 400 starts with a start block 405 that passes control to a function block 410. In block 410, a picture is decoded and concealed if necessary by the decoder. Mosaic artifact detection is performed in block 420. Based on the artifact detection results, the relevant parameters are updated in block 430. Control is then passed to end block 499.

Method 400 may be combined with method 100 to improve the accuracy of the quality metric. In one embodiment, steps performed in blocks 410-430 may be implemented between steps performed in blocks 110 and 120.

Figure 5:
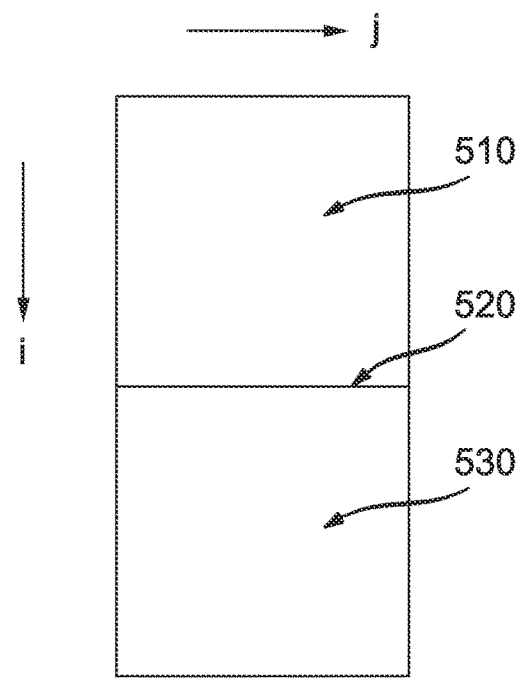
FIG. 5 is a pictorial representation of a macroblock pair.

In an exemplary embodiment of mosaic artifact detection, a second-order vertical gradient field is calculated at the MB borders of a fragmentary frame. Two second-order gradient sums for each vertically adjacent MB pair are calculated, and the one with the smaller magnitude is chosen. FIG. 5 illustrates an example of mosaic detection for a macroblock pair. In the example of FIG. 5, a macroblock pair 510 and 530 is considered, the upper one 510 consisting of pixels $\{p_{i,j} | i=1, 2, \ldots, 16 \text{ and } j=1, 2, \ldots, 16\}$ and the lower one 530 consisting of pixels $p_{i,j} / i=17, 18, \ldots, 32$ and $j=1, 2, \ldots, 16$. Two second-order gradient sums (GS) relating to the MB pair: $\Sigma_{j=1}^{16}(p_{18,j} - 2p_{17,j})$ and $\Sigma_{j=1}^{16}(p_{17,j} + p_{15,j} - 2p_{16,j})$, are calculated at the MB border 520, and the smaller one is chosen:

$$GS = \min\{|\Sigma_{j=1}^{16}(p_{18,j} + p_{16,j} - 2p_{17,j})|, |\Sigma_{j=1}^{16}(p_{17,j} + p_{15,j} - 2p_{16,j})|\}.$$

Except the top MBs and the bottom MBs in the picture, every MB corresponds to two GS: one for the upper border and one for the lower boarder. If either GS is above a threshold, the MB is marked as having a visible mosaic (MT=1), otherwise the MB is marked as having an invisible mosaic (MT=0), that is, $$MT = \begin{cases} 1, & \max(GS_{upper}, GS_{lower}) > \text{threshold} \\ 0, & \text{otherwise} \end{cases}.$$

If a block is lost but marked as having an invisible mosaic, the ratio of lost blocks may be updated as if the block is not lost. Similarly, the ratio of propagated blocks may also be updated.

The proposed mosaic detection method is based on an observation that natural images generally have a smooth first-order gradient field and a small second-order gradients. When the mosaic artifacts or other artifacts occur, the second-order gradients become higher. Thus, the second-order gradient may be used to detect artifacts.

Various constants are used in predicting the distortion factors and the composite video quality score. The constants may be trained using content databases and subjective quality metrics. In one embodiment, we train the constants for the TYPE I method using five databases for IPTV (i.e. high resolution such as SD or HD), and train the constants for the TYPE II method using three databases for Mobile TV (i.e. low resolution such as QCIF or QVGA), which both come from the P. NAMS test plan.

Consequently, we obtain a set of constants for each application for each method, as illustrated in TABLEs 2A-2F. For a TYPE 1 method, different constants are trained depending on whether mosaic detection is used. Note that the constants may need to be trained accordingly when the target applications change (i.e., the applicable video databases change).

TABLE 2F

Exemplary constants for Mobile TV - TYPE II

| $a_1$ | $a_2$ | $a_3$ | $b_2$ | $b_5$ | $b_8$ |
|---|---|---|---|---|---|
| 1.6e3 | .63 | 1.4 | −2.8 | .45 | .5 |

In the following, we discuss briefly the advantage of the present embodiments.

In the present embodiments, posynomial functions (i.e., coordinates and coefficients of the functions are positive real numbers, and the exponents are real numbers) are used throughout the calculation. Fewer parameters than other models are used for estimation simplicity and stability.

The present principles combine the distortions from different impairments as described in equation (9), which can capture the nonlinearity of human perception and keep the model simplicity and performance reliability.

According to equation (9), q will not be sensitive to arbitrary two of $d_c$, $d_s$ and $d_f$ once the other one is relative large. Using $d_c$ as the example, the first-order derivative is

TABLE 2A

Exemplary constants for IPTV—TYPE I (without mosaic detection)

| $a_1$ | $a_2$ | $a_3$ | $b_1$ | $b_2$ | $b_3$ | $b_4$ | $b_5$ | $b_6$ | $b_7$ | $b_8$ | $c_1$ | $c_2$ | $c_3$ | $c_4$ | $c_5$ |
|---|---|---|---|---|---|---|---|---|---|---|---|---|---|---|---|
| 330 | 2.6e4 | 5.0 | −1.0 | −1.6 | −.02 | −3.0 | .5 | −.02 | .45 | .65 | 1 | 1 | .2 | 0 | .9 |

TABLE 2B

Exemplary constants for IPTV—TYPE I (with mosaic detection)

| $a_1$ | $a_2$ | $a_3$ | $b_1$ | $b_2$ | $b_3$ | $b_4$ | $b_5$ | $b_6$ | $b_7$ | $b_8$ | $c_1$ | $c_2$ | $c_3$ | $c_4$ | $c_5$ |
|---|---|---|---|---|---|---|---|---|---|---|---|---|---|---|---|
| 330 | 11 | 5.0 | −1.0 | −1.6 | −.03 | −.08 | .6 | −.02 | .45 | .65 | 1 | 0 | .4 | 0 | .9 |

TABLE 2C

Exemplary constants for IPTV - TYPE II

| $a_1$ | $a_2$ | $a_3$ | $b_2$ | $b_5$ | $b_8$ |
|---|---|---|---|---|---|
| 48 | 29 | 4.7 | −1.6 | .6 | .5 |

TABLE 2D

Exemplary constants for Mobile TV—TYPE I (without mosaic detection)

| $a_1$ | $a_2$ | $a_3$ | $b_1$ | $b_2$ | $b_3$ | $b_4$ | $b_5$ | $b_6$ | $b_7$ | $b_8$ | $c_1$ | $c_2$ | $c_3$ | $c_4$ | $c_5$ |
|---|---|---|---|---|---|---|---|---|---|---|---|---|---|---|---|
| 5.5e4 | .007 | .2 | −1.5 | −3.0 | −.04 | 2.5 | .5 | −.23 | 1 | .42 | 0 | 0 | 0 | 0 | .9 |

TABLE 2E

Exemplary constants for Mobile TV—TYPE I (with mosaic detection)

| $a_1$ | $a_2$ | $a_3$ | $b_1$ | $b_2$ | $b_3$ | $b_4$ | $b_5$ | $b_6$ | $b_7$ | $b_8$ | $c_1$ | $c_2$ | $c_3$ | $c_4$ | $c_5$ |
|---|---|---|---|---|---|---|---|---|---|---|---|---|---|---|---|
| 5.5e4 | .05 | .2 | −1.5 | −3.0 | −.05 | 2 | .45 | −.23 | 1 | .42 | 0 | 0 | .2 | 0 | .9 |

$$\frac{\partial q}{\partial d_c} = \frac{-a_1}{(1+a_1 d_c + a_2 d_s + a_3 d_f)^2} \approx 0,$$

when $d_s \gg d_c$ or $d_f \gg d_c$.

This characteristic is consistent with human perception that if one type of distortion dominates the perceived quality the other types of distortions seem trivial.

Figure 6A:
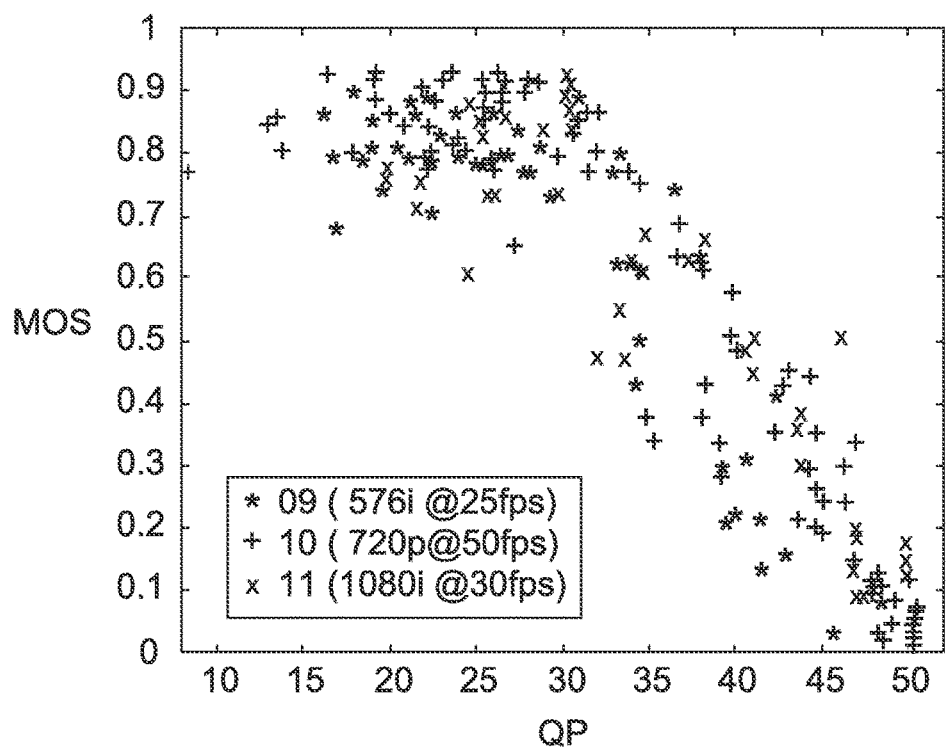
FIGS. 6A-6C are pictorial examples of how subjective quality relates to key parameters.
Figure 6B:
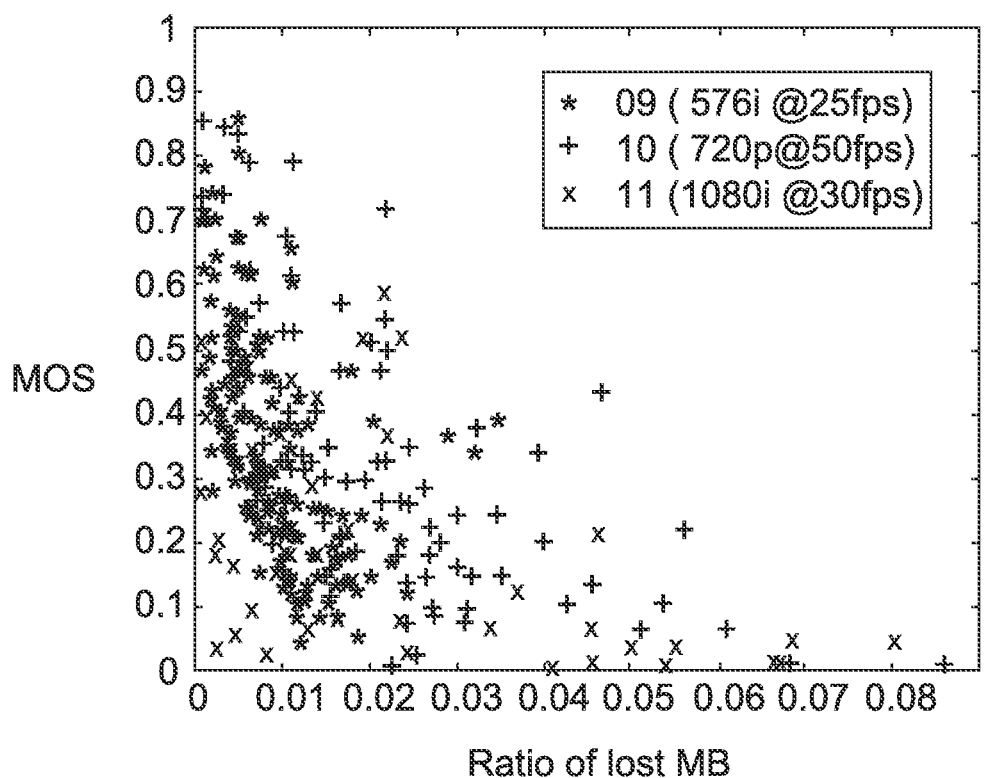
Figure 6C:
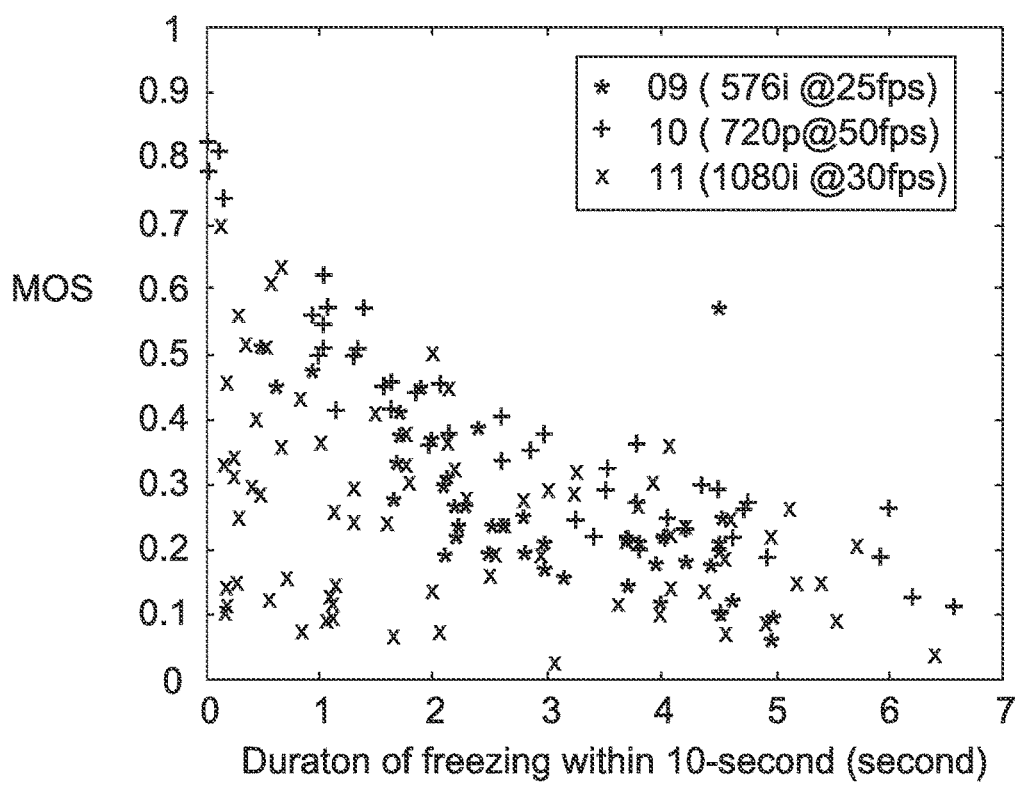

The present principles also can capture both the S-shape and L-shape relationships between the video quality and the key factors, as illustrated in FIGS. 6A-6C.

Figure 7:
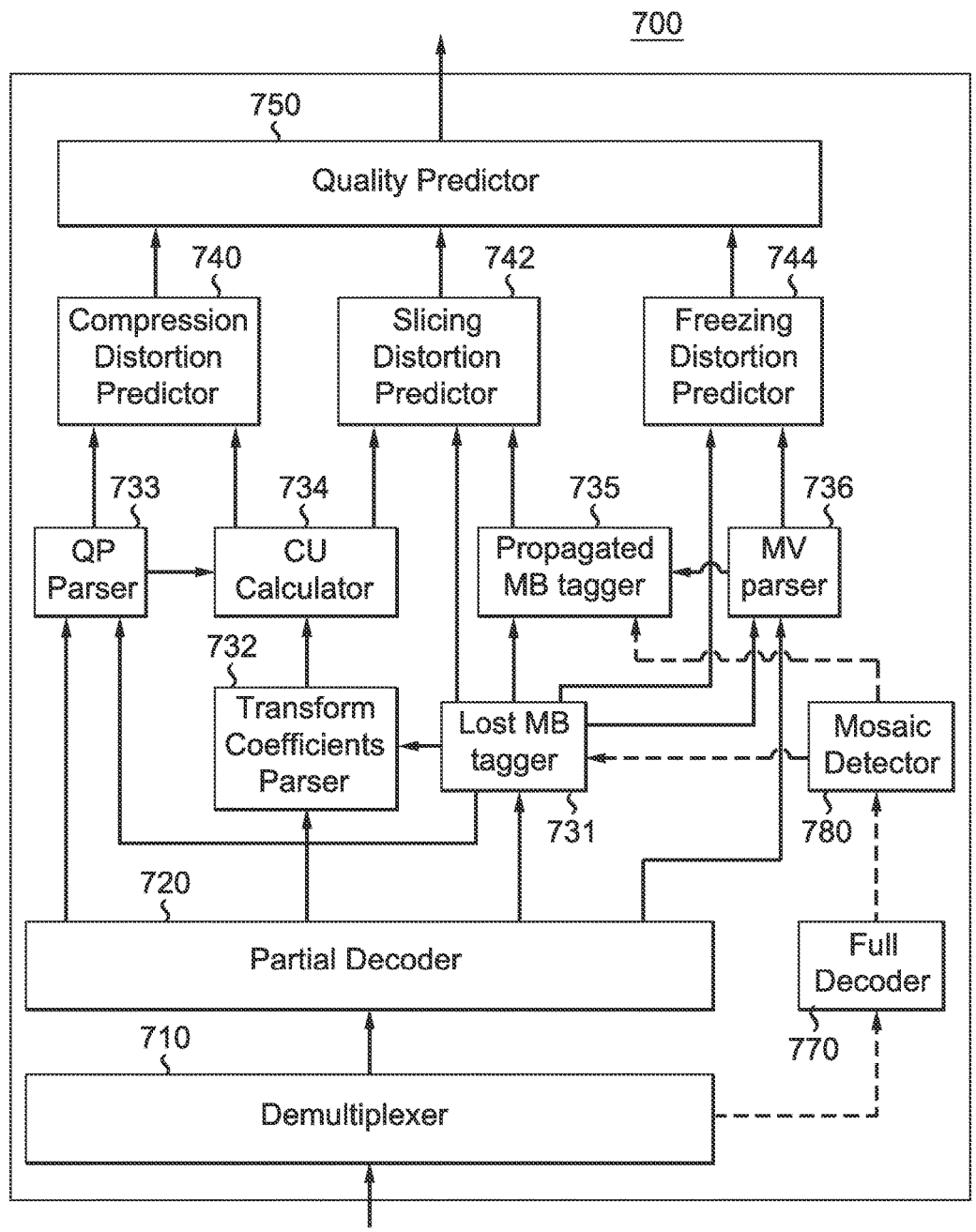
FIG. 7 is a block diagram depicting an example of a video quality measurement apparatus that may be used with one or more implementations of the present principles.

FIG. 7 depicts a block diagram of an exemplary video quality measurement apparatus 700 that can be used to generate a video quality metric for the image. The input of apparatus 700 includes a transport stream that contains the bitstream. The input may be in other formats that contains the bitstream. A receiver at the system level determines packet losses in the received bitstream.

Demultiplexer 710 parses the input stream to obtain the elementary stream or bitstream. It also passes information about packet losses to the decoder 720. The decoder 720 parses necessary information, including QPs, transform coefficients, and motion vectors for each block or macroblock, in order to generate parameters for estimating the quality of the video. The decoder also uses the information about packet losses to determine which macroblocks in the video are lost. Decoder 720 is denoted as a partial decoder to emphasize that full decoding is not performed, i.e., the video is not reconstructed.

Using the MB level QPs parsed from decoder 720, a QP parser 733 obtains average QPs for pictures and for the entire video clip. Using transform coefficients obtained from decoder 720, a transform coefficients parser 732 parses the coefficients and a content unpredictability parameter calculator 734 calculates the content unpredictability parameter for individual pictures and for the entire video clip. Using the information about which macroblocks are lost, a lost MB tagger 731 marks which MB is lost. Further using motion information, a propagated MB tagger 735 marks which MBs directly or indirectly use the lost blocks for prediction (i.e., which blocks are affected by error propagation). Using motion vectors for blocks, an MV parser 736 calculates average motion vectors for MBs, pictures, and entire video clip. Other modules (not shown) may be used to determine error concealment distances, durations of freezing, and frame rates.

After parameters, for example, those listed in TABLE 1, are obtained, a compression distortion predictor 740 estimates the compression distortion factor (for example, using equation (1) or (6)), a slicing distortion predictor 742 estimates the slicing distortion factor (for example, using equation (3) and (7)), and a freezing distortion predictor 744 estimates the freezing distortion factor (for example, using equation (5) and (8)). Based on the estimated distortion factors, a quality predictor 750 estimates an overall video quality metric, for example, using equation (9).

When extra computation is allowed, a decoder 770 decodes and conceals the pictures. The decoder 770 is denoted as a full decoder and it will reconstruct the pictures and perform error concealment if necessary. A mosaic detector 780 performs mosaic detection on the reconstructed video. Using the detection results, the lost MB tagger 731 and the propagated MB tagger 735 update relevant parameters, for example, the ratio of lost blocks and the ratio of propagated blocks.

Figure 8:
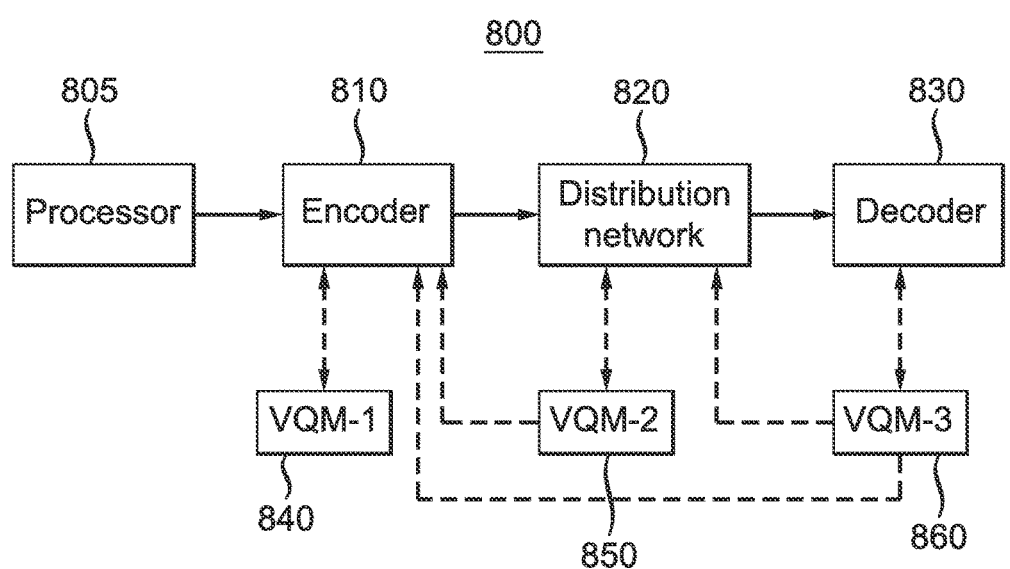
FIG. 8 is block diagram depicting an example of a video processing system that may be used with one or more implementations of the present principles.

Referring to FIG. 8, a video transmission system or apparatus 800 is shown, to which the features and principles described above may be applied. A processor 805 processes the video and the encoder 810 encodes the video. The bitstream generated from the encoder is transmitted to a decoder 830 through a distribution network 820. A video quality monitor or a video quality measurement apparatus, for example, the apparatus 700, may be used at different stages.

In one embodiment, a video quality monitor 840 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 850 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 860 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the decoder estimates qualities of concealed videos with respect to different error concealment modes. Based on the estimation, an error concealment that provides a better concealment quality may be selected by the decoder.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, mosaic detection, distortion measurement, quality measuring, and quality monitoring. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a game console, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, executed by one or more video processors, comprising:

determining parameters for a video bitstream without reconstructing a video corresponding to the video bitstream, the parameters including durations of freezing, motion vectors in pictures immediately before freezing, ratios of propagated blocks, and a frame rate, wherein propagated blocks are blocks that directly or indirectly use lost blocks for prediction;

determining a slicing distortion factor and a freezing distortion factor for the video bitstream without reconstructing a video corresponding to the video bitstream, the slicing distortion factor representative of distortion resulting from a slicing mode error concealment and the freezing distortion factor representative of distortion resulting from a freezing mode error concealment, wherein the freezing distortion factor is determined in response to the durations of freezing, the motion vectors, and the frame rate, and wherein the slicing distortion factor is determined in response to the ratios of propagated blocks; and determining a quality metric for the video in response to the slicing distortion factor and the freezing distortion factor.

2. The method of claim 1, wherein the determined parameters further include ratios of lost blocks, and wherein the slicing distortion factor is determined further in response to the ratios of lost blocks.

3. The method of claim 2, wherein the slicing distortion factor is determined in response to a power function of the ratios of lost blocks and the freezing distortion factor is determined in response to a power function of the durations of freezing.

4. The method of claim 2, the determined parameters further comprising error concealment distances, and content unpredictability parameters, wherein the slicing distortion factor is determined in response to ones of the ratios of lost blocks, the ratios of propagated blocks, the error concealment distances, the content unpredictability parameters, and the frame rate.

5. The method of claim 4, further comprising:
decoding a plurality of pictures from the video bitstream;
detecting mosaic artifacts in the plurality of pictures; and
updating at least one of the ratios of lost blocks and the ratios of propagated blocks based on the detecting.

6. The method of claim 1, wherein the determining the quality metric is further in response to a compression distortion factor representative of distortion resulting from compression.

7. The method of claim 6, wherein the quality metric is determined in response to a weighted sum of the compression distortion factor, the slicing distortion factor, and the freezing distortion factor.

8. The method of claim 7, wherein the quality metric is determined in response to $\gamma/(1+\alpha d^\beta)$, wherein d corresponds to the weighted sum and $\alpha$, $\beta$, and $\gamma$ are constants.

9. The method of claim 1, further comprising:
performing at least one of monitoring quality of the video bitstream, adjusting the video bitstream in response to the quality metric, creating a new video bitstream based on the quality metric, adjusting parameters of a distribution network used to transmit the video bitstream, determining whether to keep the video bitstream based on the quality metric, and choosing an error concealment mode at a decoder.

10. An apparatus, comprising at least one memory and one or more video processors, the one or more video processors being configured to:

determine parameters for a video bitstream without reconstructing a video corresponding to the video bitstream, the parameters including durations of freezing, motion vectors in pictures immediately before freezing, ratios of propagated blocks, and a frame rate, wherein propagated blocks are blocks that directly or indirectly use lost blocks for prediction;

determine, without reconstructing a video corresponding to the video bitstream, a slicing distortion factor representative of distortion resulting from a slicing mode error concealment;

determine, without reconstructing the video corresponding to the video bitstream, a freezing distortion factor representative of distortion resulting from a freezing mode error concealment, wherein the freezing distortion factor is determined in response to the durations of freezing, the motion vectors, and the frame rate, and wherein the slicing distortion factor is determined in response to the ratios of propagated blocks; and determine a quality metric for said video in response to the slicing distortion factor and the freezing distortion factor.

11. The apparatus of claim 10, wherein the determined parameters further include ratios of lost blocks, and wherein the slicing distortion factor is determined further in response to the ratios of lost blocks.

12. The apparatus of claim 11, the processor further determining at least one of error concealment distances, and content unpredictability parameters, wherein the slicing distortion factor is determined in response to ones of the ratios of lost blocks, the ratios of propagated blocks, the error concealment distances, the frame rate, and the content unpredictability parameters.

13. The apparatus of claim 11, wherein the one or more video processors are further configured to:
    decode a plurality of pictures from the video bitstream; and
    detect mosaic artifacts in the plurality of pictures, wherein the ratios of lost blocks and the ratios of propagated blocks are updated based on the detecting.

14. The apparatus of claim 10, wherein a compression distortion factor representative of distortion resulting from compression is determined.

15. The apparatus of claim 14, wherein the quality metric is determined in response to $\gamma/(1+\alpha d^\beta)$, where d corresponds to a weighted sum of the slicing distortion factor, the freezing distortion factor, and the compression distortion factor.

16. The apparatus of claim 10, wherein the one or more video processors are further configured to perform at least one of monitoring quality of the video bitstream, adjusting the video bitstream in response to the quality metric, creating a new video bitstream based on the quality metric, adjusting parameters of a distribution network used to transmit the video bitstream, determining whether to keep the video bitstream based on the quality metric, and choosing an error concealment mode at a decoder.

17. A non-transitory processor readable medium having stored thereupon instructions for causing one or more processors to collectively perform:

determining parameters for a video bitstream without reconstructing a video corresponding to the video bitstream, the parameters including durations of freezing, motion vectors in pictures immediately before freezing, ratios of propagated blocks, and a frame rate, wherein propagated blocks are blocks that directly or indirectly use lost blocks for prediction;

determining at least one of a slicing distortion factor and a freezing distortion factor for the video bitstream without reconstructing a video corresponding to the video bitstream, the slicing distortion factor representative of distortion resulting from a slicing mode error concealment and the freezing distortion factor representative of distortion resulting from a freezing mode error concealment, wherein the freezing distortion factor is determined in response to the durations of freezing, the motion vectors, and the frame rate, and wherein the slicing distortion factor is determined in response to the ratios of propagated blocks; and determining a quality metric for the video in response to the slicing distortion factor and the freezing distortion factor.

* * * * *